US009501713B2

(12) United States Patent
Pau

(10) Patent No.: US 9,501,713 B2
(45) Date of Patent: Nov. 22, 2016

(54) METHOD OF PRODUCING COMPACT DESCRIPTORS FROM INTEREST POINTS OF DIGITAL IMAGES, CORRESPONDING SYSTEM, APPARATUS AND COMPUTER PROGRAM PRODUCT

(71) Applicant: STMicroelectronics S.r.l., Agrate Brianza (IT)

(72) Inventor: Danilo Pietro Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 128 days.

(21) Appl. No.: 14/516,310

(22) Filed: Oct. 16, 2014

(65) Prior Publication Data

US 2015/0103199 A1  Apr. 16, 2015

(30) Foreign Application Priority Data

Oct. 16, 2013  (IT) .............................. TO2013A0835

(51) Int. Cl.
*G06K 9/00* (2006.01)
*G06K 9/46* (2006.01)
*G06K 9/62* (2006.01)
*G06T 7/00* (2006.01)

(52) U.S. Cl.
CPC ........... *G06K 9/4647* (2013.01); *G06K 9/4671* (2013.01); *G06K 9/6212* (2013.01); *G06T 7/0022* (2013.01); *G06T 2207/10004* (2013.01); *G06T 2207/20021* (2013.01); *G06T 2207/20024* (2013.01); *G06T 2207/20076* (2013.01)

(58) Field of Classification Search
USPC ....................................................... 382/190
See application file for complete search history.

(56) References Cited

U.S. PATENT DOCUMENTS 5,978,519 A * 11/1999 Bollman ................. G06T 7/004
382/270
2006/0013481 A1* 1/2006 Park ................... G06F 17/30259
382/170
2007/0237387 A1* 10/2007 Avidan ............... G06K 9/00369
382/159

(Continued)

OTHER PUBLICATIONS

Agrawal et al., "CenSurE: Center Surround Extremas for Realtime Feature Detection and Matching," ECCV 2008, Part IV, LNCS 5305, Forsyth et al. (Eds.), Springer-Verlag Berlin Heidelberg 2008, pp. 102-115.

(Continued)

*Primary Examiner* — John Strege
(74) *Attorney, Agent, or Firm* — Seed IP Law Group LLP

(57) ABSTRACT

Compact descriptors of digital images are produced by detecting interest points representative of the digital images and selecting out of the interest points key points for producing e.g. local and global compact descriptors of the images. The digital images are decomposed into blocks by computing an energy (variance) for each said block and then subjecting the blocks to culling by rejecting those blocks having an energy failing to pass an energy threshold. The interest points are detected only in the blocks resulting from culling, and the key points for producing the compact descriptors are selected out of the interest points thus detected, possibly by using different selection thresholds for local and global compact descriptors, respectively. The number of key points for producing the compact descriptors may be varied e.g. by adaptively varying the number of the interest points detected in the blocks resulting from culling.

30 Claims, 4 Drawing Sheets

(56) References Cited

U.S. PATENT DOCUMENTS

2010/0254573 A1   10/2010  Barlaud et al.
2013/0101226 A1*  4/2013  Tang ................... G06K 9/4647
                                            382/201
2015/0189182 A1*  7/2015  Ho .................... H04N 5/23267
                                            348/208.6

OTHER PUBLICATIONS

Bay et al., "SURF: Speeded Up Robust Features," *Computer Vision and Image Understanding (CVIU)* 110(3):346-359, 2008.

Bober et al., "Test Model 2: Compact Descriptors for Visual Search," Video Subgroup, International Organisation for Standardisation, Coding of Moving Pictures and Audio, ISO/IEC JTC1/SC29/WG11/W12734, May 2012, Geneva, CH, 28 pages.

Bober et al., "Test Model 4: Compact Descriptors for Visual Search," Video Subgroup, International Organisation for Standardisation, Coding of Moving Pictures and Audio, ISO/IEC JTC1/SC29/WG11/W13145, Oct. 2012, Shanghai, CN, 42 pages.

Bober et al., "Test Model 7: Compact Descriptors for Visual Search," Video Subgroup, International Organisation for Standardisation, Coding of Moving Pictures and Audio, ISO/IEC JTC1/SC29/WG11/W13758, Aug. 2013, Vienna, Austria, 51 pages.

Calonder et al., "BRIEF: Binary Robust Independent Elementary Features," Proceedings of the European Conference on Computer Vision (ECCV), Crete, Greece, 2010, 14 pages.

Choraś et al., "Integrated color, texture and shape information for content-based image retrieval," *Pattern Anal Applic* 10:333-343, 2007.

Lowe, "Distinctive Image Features from Scale-Invariant Keypoints," *Internaitonal Journal of Computer Vision* 60:91-110, 2004.

Rosten et al., "Machine learning for high-speed corner detection," European Conference on Computer Vision (ECCV) 1:430-443, 2006.

Salti et al., "A Performance Evaluation of 3D Keypoint Detectors," 2011 International Conference on Digital Object Identifier: 10.1109/3DIMPVT.2011.37, pp. 236-243.

Ta et al., "SURFTrac: Effcent Tracking and Continuous Object Recognition using Local Feature Descriptors," IEEE Conference on Computer Vision and Pattern Recognition, Jun. 20-25, 2009, Miami, FL, pp. 2937-2944.

\* cited by examiner

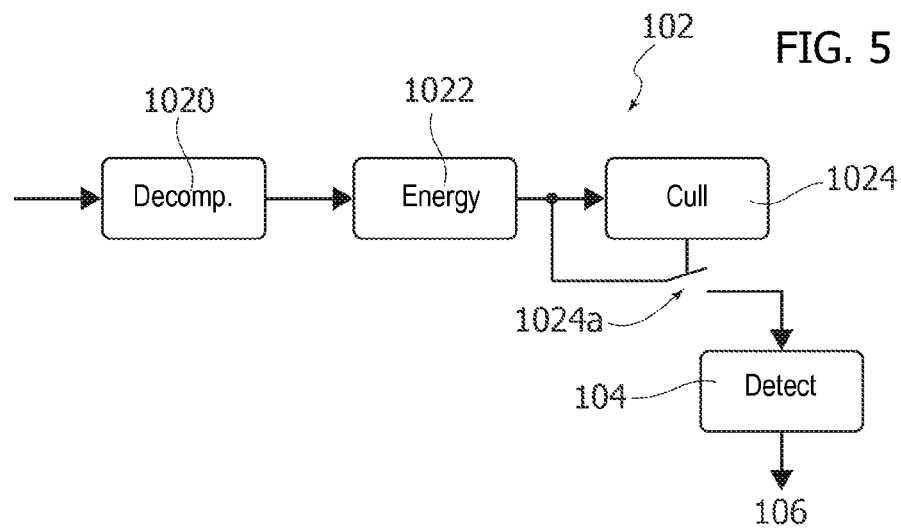
FIG. 5
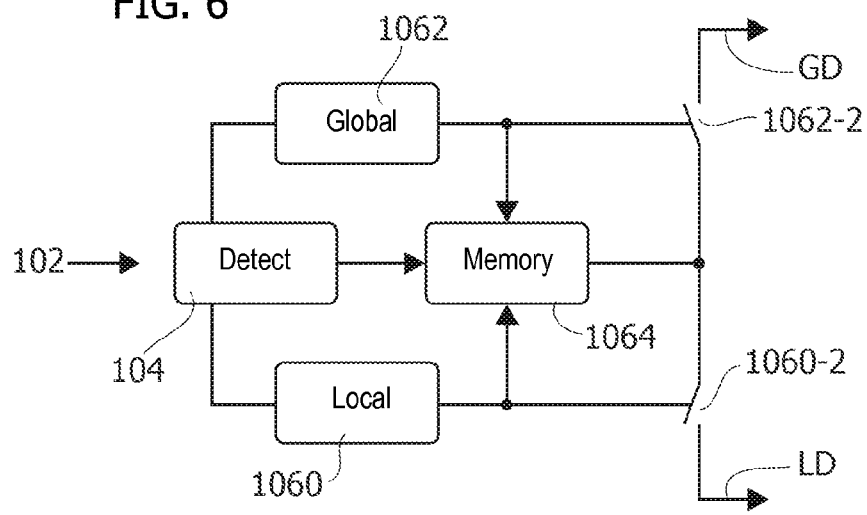
FIG. 6
FIG. 7
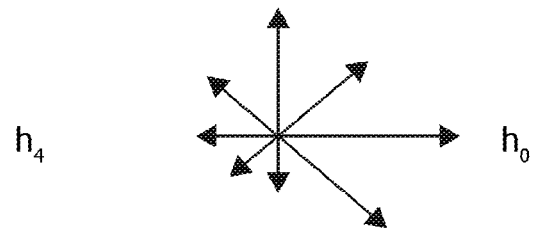

METHOD OF PRODUCING COMPACT DESCRIPTORS FROM INTEREST POINTS OF DIGITAL IMAGES, CORRESPONDING SYSTEM, APPARATUS AND COMPUTER PROGRAM PRODUCT

CROSS REFERENCE TO RELATED APPLICATIONS

This application claims the priority benefit of Italian Patent application number TO2013A000835, filed Oct. 16, 2013.

BACKGROUND

Technical Field

The present description relates to processing digital images.

One or more embodiments may apply to the early removal and detection of interest points from still and video contents.

One or more embodiments may be used in search and retrieval applications.

Discussion of the Related Art

An increasing amount of digital still and video contents is produced and consumed every day.

Still image and video search and retrieval applications have become increasingly important for content-based image retrieval searching of objects, places and people which are part of the image contents.

Extraction of interest points and compact descriptors from still and video signals may play a significant role in those applications.

The paper by Miroslaw Bober et al. "Test Model 4: Compact Descriptors for Visual Search, Video Subgroup", Shanghai 2012, China, ISO/IEC JTC1/SC29/WG11/W13145, discloses a model of MPEG Compact Descriptors for Visual Search (CDVS).

For instance, FIG. 1 in that document presents an extraction module which produces a compact descriptor including two main elements, namely a selected number of compressed—local—descriptors and a single—global descriptor—e.g. a digest of local descriptors, representing the whole image.

This known model may exhibit a serious lack of efficiency on the interest point side (for example DoG—Difference Of Gaussian) e.g. when a still or video image is processed.

This lack of efficiency may become increasingly serious as the number of DoG's per octave increases. For instance, if 4 octaves are processed with 5 scales computed for each octave, then 4 DoG responses are computed per each octave to a total of 20.

Avoiding inasmuch as possible DoG computation may reduce processing and computation complexity. In fact, each DoG is a per-pixel difference between consecutive scales which in turn are computed by using complex Gaussian filters applied plural times to the whole image.

Also, the Test Model considered in the foregoing involves a Keypoint Selection block using a combination of statistical features. These include distances of key points from the image center in order to weigh (and hence to rank for selection) key points before passing them to the description stage and the global vector description stage.

Such an approach may have benefits, e.g. a "native" adaptivity to the statistical nature of input data without any kind of a-priori knowledge. However, that approach fails to demonstrate adaptivity to the different nature of the visual descriptors that feed the local and global descriptor encoding processes. This may play a role in predicting points of interest in still and video images from the semantic point of view (e.g. location of faces or other objects), for the purpose of computing local and/or global descriptors.

The paper by Duy-Nguyen Ta et al. "SURFTrac: Efficient Tracking and Continuous Object Recognition using Local Feature Descriptors", IEEE Computer Society Conference on Computer Vision and Pattern Recognition (CVPR), June 2009, describes an algorithm (SURFTrac) for extracting descriptors of a series of digital video images.

For the first image, the algorithm initializes a list of interest points by performing a full detection. As new images are received, the interest points are updated. The descriptors are for recognition purposes and the algorithm computes them as needed.

More specifically, the algorithm in question first builds a map of SURF features extracted from a set of key-frame images captured from the surrounding environment. After extracting and matching with this map SURF features of the first video frame, the algorithm tracks those features locally in the subsequent frames. The key-frame which has the largest overlapping area with the current video frame is called a key-node.

The overlapping areas of nearby key-frames are updated in every frame based on their inter-frame homographies, and thus the key-node is continuously switched to the most similar image in the database: this allows constant tracking and exploration of new regions in the video sequences. Also, during initialization, the algorithm in question computes the full SURF feature descriptors from the first video image and matches them against images.

This method constructs an approximate nearest neighbour tree for all the image features in the database followed by geometric verification (RANSAC "RANdom SAmple Consensus" algorithm).

Upon successfully identifying the matching images, the best image is marked as the current key-node, and the set of images in-play is reduced to only those images that are connected by a path in the database. The database of images is organized as follows: V is a collection of images; G is an undirected graph where images forms the nodes in the graph, and the edges describe the relationships between the images.

An edge between two images indicates a geometric relationship when these two images can be related through standard pairwise image matching. Each image is also further identified with one or more identifiers and two images sharing the same identifier are also connected by an additional edge. This organization is similar to a graph of images constructed for hierarchical browsing purposes.

Additional documents of interest may include, e.g.:

Agrawal et al.: "Censure: Center Surround Extremas for Realtime Feature Detection and Matching", in European Conference on Computer Vision—ECCV, pp. 102-115, 2008; DOI: 10.1007/978-3-540-88693-8_8

Herbert Bay, Andreas Ess, Tinne Tuytelaars, Luc Van Gool: "SURF: Speeded Up Robust Features", Computer Vision and Image Understanding (CVIU), Vol. 110, No. 3, pp. 346-359, 2008

Rosten et al.: "Machine Learning for High-Speed Corner Detection", in Conference: European Conference on Computer Vision—ECCV, vol. 1, pp. 430-443, DOI: 10.1007/11744023_34

Salti, S.; Tombari, F.; Di Stefano, L. A: "Performance Evaluation of 3D Keypoint Detectors 3D Imaging, Modeling, Processing, Visualization and Transmission (3DIMPVT)", 2011 International Conference on Digital Object Identifier: 10.1109/3DIMPVT.2011.37 Publication Year: 2011, Page(s): 236-243.

SUMMARY

The prior discussion indicates the need for improved solutions which e.g. may enable a reduction of temporal redundancy in a video sequence, a prediction of areas of interest in images from the semantic point of view (location of faces, for instance), full predict contents analysis, and the like.

One or more embodiments may satisfy such a need.

An embodiment provides a method of producing compact descriptors of digital images, the method including: detecting in said digital images interest points representative of said digital images, and selecting out of said interest points representative of said digital images key points for producing said compact descriptors, decomposing said digital images into blocks, computing an energy (variance) for each said block, subjecting said blocks to culling by rejecting those blocks having an energy failing to pass an energy threshold, detecting said interest points in the blocks resulting from said culling, and selecting said key points for producing said compact descriptors out of the interest points detected in the blocks resulting from said culling.

According to an embodiment, the method for producing local and global compact descriptors of digital images includes selecting said key points out of the interest points detected in the blocks resulting from said culling is against different selection thresholds for said local and global compact descriptors, respectively.

According to an embodiment, the method includes selecting said key points out of said interest points detected as a function of entities selected out of scale, coordinates and orientation of said interest points.

According to an embodiment, said selecting said key points out of said interest points detected involves comparing a, preferably linear, combination of scale, coordinates and orientation of said interest points against at least one selection threshold.

According to an embodiment, an embodiment provides adaptively varying the number of said key points for producing said compact descriptors.

According to an embodiment, said adaptively varying the number of said key points for producing said compact descriptors includes adaptively varying the number of the interest points detected in the blocks resulting from said culling.

According to an embodiment, adaptively varying the number of the interest points detected in the blocks resulting from said culling includes setting a number L_next_frame of target interest points to be detected for a next i+1-th frame starting from a number L_prev_frame of interest points detected for a previous i-th frame as a function of the number points_detected_prev_frame of interest points selected for said previous i-th frame and a new target number points_targeted_next_frame of selected interest points for said next i+1-th frame.

According to an embodiment, detecting the interest points in the blocks resulting from said culling is by at least one of: filtering out low contrast points, and edge response elimination.

According to an embodiment, said filtering out low contrast points includes: detecting stable interest point locations in scale space by using scale-space extrema in the Difference-of-Gaussian function convolved with the image $D(x, y, \sigma)$, determining a value of a, preferably $2^{nd}$-order, Taylor expansion of $D(x, y, \sigma)$ at an offset x using the scale space value at a previously found location, and filtering out those points for which the value determined fails to pass a low contrast threshold.

According to an embodiment, said edge response elimination includes: determining Hessian Eigenvalues of a, preferably 2×2, Hessian matrix H computed at the location and scale of an interest point being considered, computing a ratio R of, preferably the square of, the trace Tr(H) and the Determinant Det (H) of said Hessian matrix, and eliminating those point for which said ratio R fail to pass an edge response threshold.

According to an embodiment, the method includes making at least one of said low contrast and edge response thresholds adaptive on a frame-by-frame basis.

According to an embodiment, there is provided a system for producing compact descriptors of digital images.

According to an embodiment, there is provided an apparatus including: a system for generating compact descriptors according to claim 11, and an image capture device for generating digital images and providing said digital images said system for generating compact descriptors thereof.

According to an embodiment, there is provided a computer program product, loadable in the memory of at least one computer and including software code portions for implementing a method for generating compact descriptors when run on said at least one computer.

One or more embodiments may relate to a corresponding system, a corresponding apparatus including a digital image capture device to produce digital images/frames for processing by such a system, as well as to a computer program product loadable in the memory of at least one computer and including software code portions for executing the steps of the method when the product is run on at least one computer. As used herein, reference to such a computer program product is understood as being equivalent to reference to a computer-readable means containing instructions for controlling the processing system in order to co-ordinate implementation of the method according to an embodiment. Reference to "at least one computer" is intended to highlight the possibility of embodiments of the present disclosure being implemented in modular and/or distributed form.

The claims are an integral part of the technical teaching provided herein.

One or more embodiments may be applied to extraction of interest points from still and video image content, e.g. for search and retrieval purpose.

In one or more embodiments, extraction of interest points may involve an early rejection of image areas which may not include interest points and descriptors later marked as inliers.

One or more embodiments may rely on the recognition that certain parts of the source image may not include relevant information from a statistical point of view; consequently, their processing, while adding to computational complexity, does not offer any appreciable contribution the final result.

One or more embodiments may involve processing of interest points only at scale level, their selection depending on whether they may contribute to local descriptor encoding or to global descriptor encoding from still and video content.

One or more embodiments may include:

an early rejection block, configured to reject without further processing blocks of images without meaningful content, such blocks being representative e.g. of a spatial and temporal region of a still or video image signal which is visually homogeneous;

a detection block configured to compute interest points of the blocks into which an image has been decomposed;

a selector block of interest points, adapted to be implemented in different ways by using different strategies. One or more embodiments may thus involve, e.g.:

selecting, out of the candidate data included in a block, key point data for further processing for local and global description coding, possibly using different tuned thresholds, a selection process coupled to an interest point detection step.

BRIEF DESCRIPTION OF THE FIGURES

One or more embodiments will now be described, purely by way of non-limiting example, with reference to the annexed figures, wherein:

FIG. 5 is a functional block diagram of block culling in embodiments;

FIGS. 6 and 7 are exemplary of processing related to global descriptor and local descriptor extraction in embodiments;

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for the convenience of the reader and hence do not define the scope of protection or the scope of the embodiments.

Figure 1:
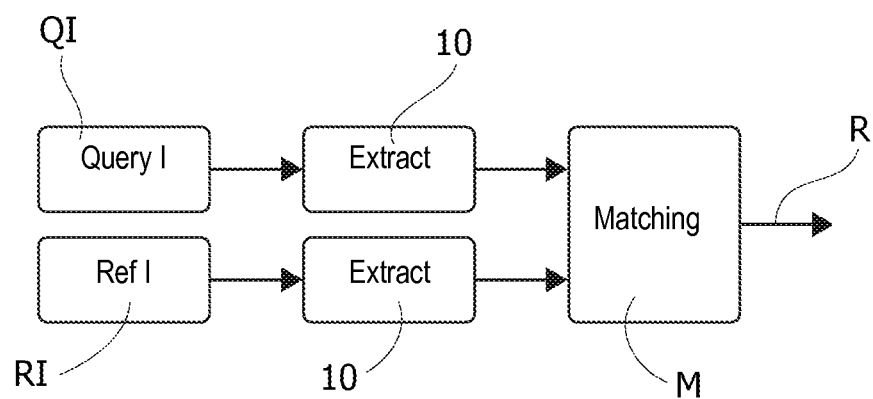
FIGS. 1 and 2 are functional block diagrams that illustrate exemplary processing of treatment of images based upon extraction of features.
Figure 2:
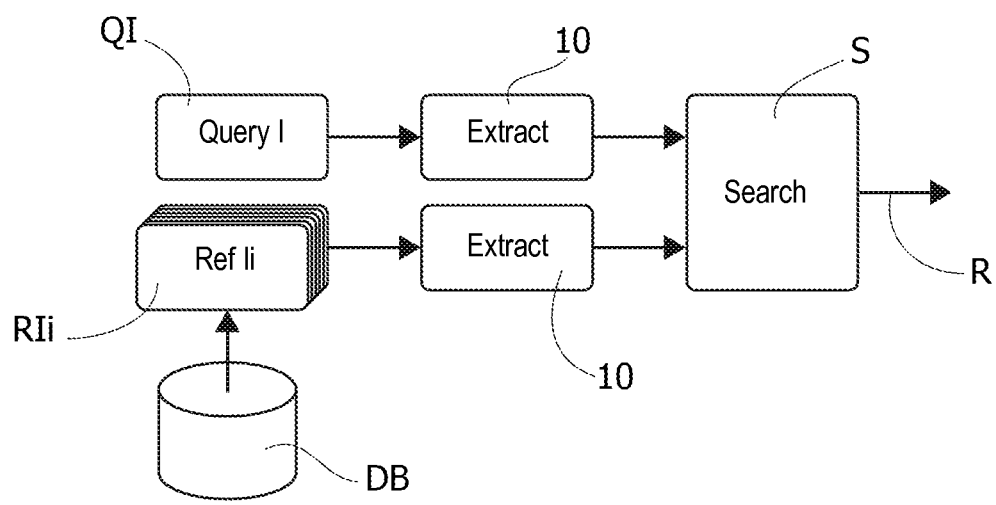

FIGS. 1 and 2 are block diagrams exemplary of functional architectures for performing pair-wise matching M or retrieval (searching) S of digital images e.g. digital video frames.

A matching function/module M as exemplified in FIG. 1 may make it possible to verify in an automated way (for example, via a computer) whether two images represent the same objects or the same scene.

This result may be achieved by operating on a query image QI and on a reference image RI. For that purpose, both the images may be subjected to an operation of extraction of descriptors (which is designated as a whole by 10) and to an operation of comparison performed at M by operating on these descriptors as extracted at 10, the comparison being aimed at detecting a possible matching. The result of the matching operation, designated by R, indicates whether the query image QI represents or not the same objects or the same scene, namely "matches" the reference image RI.

The retrieval function of FIG. 2 may operate according to the same criteria save that, in the case of retrieval, the comparison at S is made with a number of reference images $RI_i$ extracted from a data base DB. In that way, it is possible to search and retrieve, within the data base DB, one or more images that reproduce the same objects or the same scene as the query image QI.

Various embodiments as exemplified herein may take the form of processing systems (adapted to be structured e.g. as a processing pipeline) for extracting features from a image signal to produce compact descriptors CD of digital images I (e.g. digital video frames). Such descriptors may include, in addition to a certain number of local descriptors LD, a single global descriptor GD referring to the image as a whole.

As used herein, the term "image" will include still images/pictures as well as frames in a video sequence. In the context of the instant disclosure, "video" will thus cover also e.g. still images/pictures, 2D video stream, and 3D video stream e.g. 2D video plus depth for each image, such as an additional matrix of same size of the image which may contain per-pixel depth information.

Similarly, while three matrixes may contain video pixel information on "Y", "U" and "V" components, per time frame, equivalent colour spaces may be used in one or more embodiments.

Figure 3:
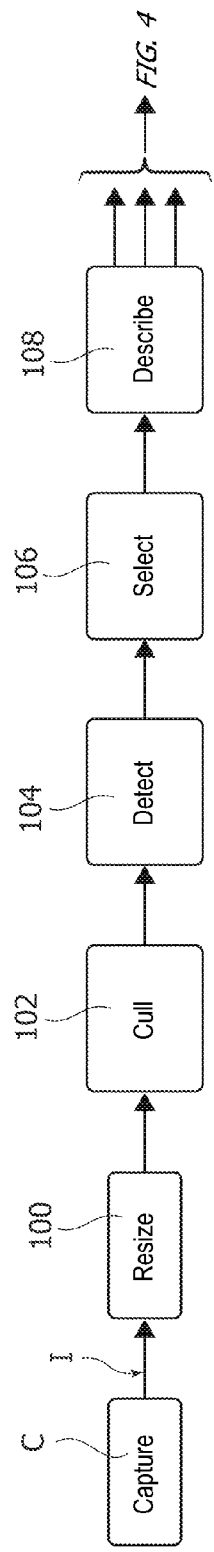
FIGS. 3 and 4 are functional block diagrams of exemplary embodiments.
Figure 4:
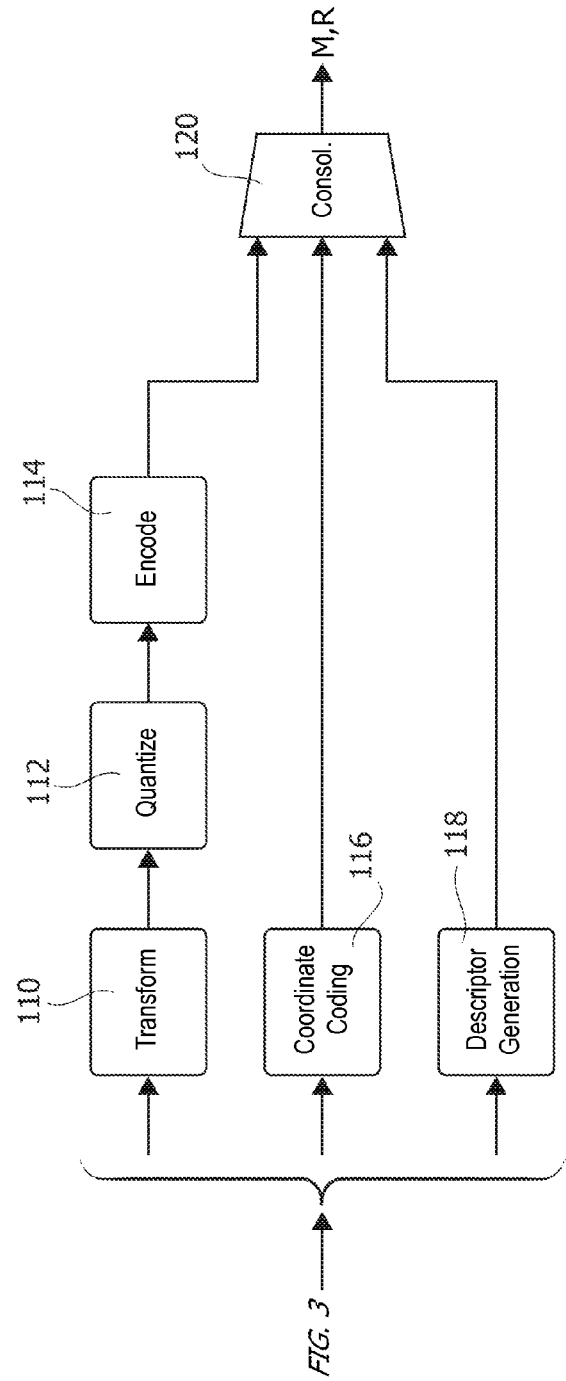

More specifically FIGS. 3 and 4 show a block diagram of exemplary embodiments of a CDVS (Compact Descriptors for Visual Search) extractor intended to operate on "images" as produced by a video capture device C.

For the purposes herein, the block C will thus be representative of any image (picture) capture device adapted to produce digital images for processing as exemplified in the following, e.g. to generate an output stream of compressed descriptors of input images I.

By way of example, the input images I may be included in a video sequence at a certain frame rate and resolution, e.g. images (frames) with a distance in time which is the inverse (reciprocal) of an associated frame rate.

For the sake of simplicity, throughout this description it will be assumed that the luminance components are extracted to be forwarded to subsequent processing. Those of skill in the art will otherwise appreciate that the same processing exemplified herein may be applied to any of the component channels of the image or any (linear) combination of these.

In one or more embodiments, the images I may be input to an (optional) resizing function/module 100 to modify image resolution, so that the images I as output from the resizing function/module 100 may have a resolution different from the resolution of the original input images.

In one or more embodiments, the images I (possibly resized at 100) may be forwarded to a block culling function/module 102 where they may be decomposed into e.g. non-overlapping blocks of fixed size.

The action of the function/module 102 is termed a "culling" action in that only some of the blocks into which the input images I are decomposed may be output towards to a subsequent detection function/module 104.

In one or more embodiments, culling (that is selection of one or more blocks for further processing, while the other blocks are rejected) as performed in the block 102 of FIG. 3 may involve processing as exemplified in the block diagram of FIG. 5.

In such exemplary embodiment the function/module 102 may include a set of functions/modules 1020, 1022 and 1024. In FIG. 5, the block 1020 is exemplary of a block decomposition function/module, where the input images I (possibly resized at 100) may be decomposed e.g. into square or rectangular blocks.

In one or more embodiments, the image blocks thus produced may be fed to a block energy computation function/module 1022 where the energy (variance) Var(X) of the blocks is computed.

The variance is a well defined entity in statistics, which may be computed in different ways. One exemplary formula for computing the energy or variance of a block may be the following:

$$\mathrm{Var}(X) = \sum_{i=1}^{n} (p_i \cdot (x_i - \mu)^2) = \sum_{i=1}^{n} (p_i \cdot x_i^2) - \mu^2$$

where the random variable X is discrete with probability mass function $x1 \mapsto p1, \ldots, xn \mapsto pn$, $\mu$ is the expected value, i.e $$\mu = \sum_{i=1}^{n} p_i \cdot x_i.$$

Specifically, $p_i$ may represent a multiplicative coefficient which shares the same index i of $x_i$, where $x_i$ is the value (e.g. intensity) of pixel in a i-th position in the block as scanned e.g. line-by-line or column-by-column. For instance, in a 8×8 block (8 lines and 8 columns), i may vary between 1 and 64 (e.g. i=1, ..., 8 for the first line; i= 9, ..., 16 for the second line and so on).

In one or more embodiments, the values for the energy (e.g. variance) of the blocks may then be sent to a block culling decision function/module 1024, whereby only those blocks having an energy (variance) passing a certain threshold (possibly tunable) may be retained for further processing (e.g. interest point detection and subsequent processing). Conversely, if the threshold is not passed, e.g. the energy (variance) is lower than a given threshold set at 1024, the respective block will not be further processed thus reducing computational complexity.

In one or more embodiments, (only) the image blocks passing the energy (variance) threshold are thus retained for eventual use in generating compact descriptors. The arrangement in question thus implements, so-to-say, an "early rejection" action whereby those image blocks expectedly having no meaningful content are rejected, thus avoiding that these should be further processed.

The selective action of the function/module 1024 is schematically represented in FIG. 5 in the form of a "switch" 1024a which is opened (i.e. made non conductive) by the decision function/module 1024 if the energy threshold is not passed e.g. if the energy is lower than the threshold. If, conversely, the threshold is passed, e.g. the energy is at the threshold or higher, the decision function/module 1024 will close the switch (i.e. make it conductive) so that the block "surviving" the energy analysis may be forwarded to a (block-based) detection function/module as exemplified by block 104.

In one or more embodiments, being block-based, the processing described herein may be "parallelized" (e.g. with plural blocks being processed in parallel) which may lead to improved performance in terms of processing speed and reduced power consumption.

In one or more embodiments, the image blocks "surviving" the block culling action performed at 102 may be subjected to interest point detection processing at 104 to find distinctive points (key points) of the images.

A number of implementations of interest point detection are described e.g. in various documents already cited in the introductory portion of this description (Agrawal et al.; Bay et al.; Rosten et al. and Tombari et al.).

In one or more embodiments as exemplified herein, the output of the detection function/module 104 may include interest points (only) for those image blocks which have been retained after the culling action at 102.

In one or more embodiments, these interest points may be represented by their [x, y] coordinates, scale, peak, distance from extrema detected, surrounding patch (e.g. M×N) of pixels.

In one or more embodiments, the output from the detection function/module 104 may be fed to a selection function/module 106. In the selection function/module 106, the interest points as output from the detection function/module 104 may be further selected as better detailed in the following to yield distinctive points (key points) for further use in a local (visual) descriptor generator function/module 108.

In one or more embodiments, the output from the function/module 108 may be fed to the functions/modules 110 to 120 of FIG. 4 to be subjected to processing as further detailed in the final portion of this description.

In one or more embodiments, the output from the function/module 108 may include e.g. a number of vectors of e.g. 128 elements of 1 byte each.

In one or more embodiments, the function/module 108 may implement a procedure as described e.g. Calonder M. et al.: "BRIEF: Binary robust independent elementary features", in Proc. of European Conference on Computer Vision (ECCV), Crete, Greece, 2010, (see especially paragraphs 3.1, 3.2). That procedure uses binary strings as an efficient feature point descriptor, and such a descriptor may rely on a relatively small number of intensity difference tests to represent an image patch as a K-bit binary string. A descriptor similarity may be evaluated using the Hamming distance between these strings.

In one or more embodiments, the local descriptor function/module 108 may implement a procedure as described in the document ISO/IEC JTC1/SC29/WG11/W13758 August 2013, Vienna, Austria—Test Model 7: Compact Descriptors for Visual Search e.g. by computing gradient orientation in a M×N patch of pixels binned into a fixed number of histograms to compute a 16×8 bytes descriptor.

In one or more embodiments as described herein, processing the output from the detection function/module 104 may involve a temporary storage of data in a block-based local memory thus avoiding full video frame storage or full image re-composition at this stage.

FIG. 6 is a block diagram of a selection process which, in one or more embodiments, may be performed at 106 on the output from the detection function/module 104 (this is shown in both FIGS. 5 and 6 for immediate reference). By feeding the function/module represented by the block 108 in FIG. 3.

In that respect, it will be appreciated that while a single line of connection of the block 108 to the block 106 is shown for simplicity in FIG. 3, the block 108 may e.g. be connected to the lines labeled LD and GD in FIG. 6.

More specifically, FIG. 6 refers to an exemplary dual-stage selection performed at 106 which involves stages 1060 and 1062, configured to perform, e.g. based on respective (possibly adjustable) thresholds, selection processes which may be positively "tuned" in view of possible use for local descriptors and a global descriptors, respectively.

In one or more embodiments, the results of selection (performed e.g. as illustrated in FIG. 6) may be stored in a block-based local memory 1064, from which data for local descriptors LD and a global descriptors GD computation may be retrieved.

Possible processing as represented by the block 108 is schematically exemplified in FIG. 7, which shows so-called SIFT bins for e.g. 4×4 blocks, e.g. 8 (eight) possible orientations for 4×4 blocks, by referring to SIFT (Scale Invariant Feature Transform) processing as described e.g. in D. G. Lowe: "Distinctive Image Features from Scale-Invariant Keypoints", International Journal of Computer Vision, 60, 91-110 (2004), with SIFT local descriptors around each interest point gradients. These may represent a 45 degree relative orientation bin which may be used to produce a SIFT descriptor in the stage 108.

Figure 8:
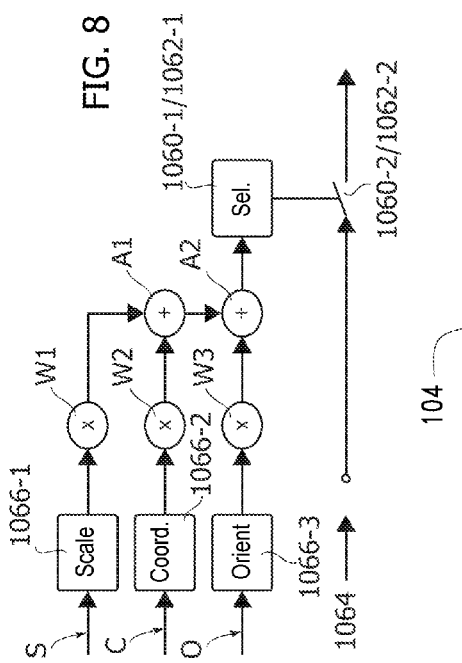
FIG. 8 is a block diagram of a selection process in embodiments.
Figure 9:
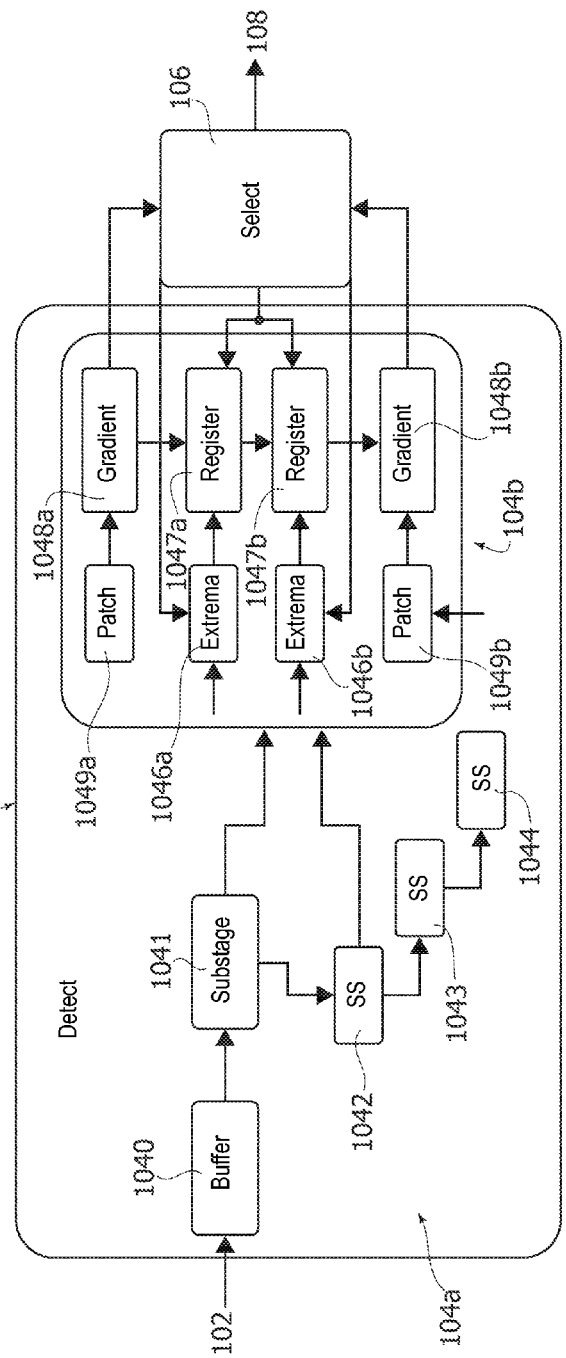
FIG. 9 a schematic representation of a multi stage selection process in embodiments.

FIGS. 8 and 9 refer to one or more possible embodiments of the selection function/module 106 (e.g. as outlined with reference to FIG. 6).

In one or more embodiments, the probability for a candidate interest point to become a key point to be forwarded to local/global description processing e.g. block 108 (and 118) may be determined as follows:
  i) for each x,y coordinate and for each possible orientation compute a probability that the x,y coordinate is a key point;
  ii) if the probability thus computed passes, e.g. is (equal) or higher than, a certain threshold (e.g. 1)>>>then the point in question is a key point; iii) else, if the probability thus computed does not pass, e.g. is lower than, a certain threshold (e.g. 1) then the point in question is not considered to be a key point and is discarded.

In one or more embodiments, the thresholds applied in order to select key points for local descriptor or global descriptor processing may be different.

As indicated, FIG. 7 exemplifies 8 (eight) possible orientations for 4×4 blocks by referring with SIFT local descriptors computed form interest point gradients. For instance a 16×16 pixel oriented patch may be derived for the neighboring pixels and divided in 4×4 pixel patches. For each of these, the orientations of gradients are computed and binned into e.g. 8 bins representing 45 degree relative orientations (e.g. 0, 45, 90, 135, 180, 225, 270, and 315 degrees).

FIG. 8 is an exemplary practical implementation of a selection strategy adapted to be implemented in either or both of the blocks 1060 and 1062: for that reason the various elements in FIG. 8 are collectively labeled 1060/1062.

In one or more embodiments, such a strategy may involve memory capabilities 1066-1, 1066-2 and 1066-3 (e.g. Look Up Tables or LUTs) for scale S, coordinates D and orientations O. Such a selection strategy may involve a combination (e.g. a linear combination, as a non limiting example) of these entities in order to decide which candidate interest points may be forwarded to local/global description processing.

A logical principle underlying the exemplary embodiment of FIG. 8 may be expressed as follows:
  for each scale S (stored at 1066-1)
  for each x,y coordinate pair C (stored at 1066-2)
  for each possible orientations O (stored at 1066-3)
  compute (e.g. via a linear combination expressed by weights W1, W2, W3 and sums A1, A2) a probability value [0, 1] that the x,y coordinate may correspond to a key point.
  if the combination passes, e.g. is (equal or) higher than, a threshold (as set at 1060-1/1060-2: as indicated, thresholds for local descriptor and global descriptor processing may be different), then the point is selected as a key point.
  if the combination does not pass, e.g. is lower than, the threshold, then the point is not considered to be a key point and is discarded ("killed").

In one or more embodiments, the selectors 1060-1 and 1060-2 (one single block in FIG. 8 is "double" labeled 1060-1/1062-1 to indicate that such a function/module is adapted to be implemented in either or both of the selectors 1060 and 1062) may decide what points may become key points to be retrieved from the memory 1064 and forwarded to local and global descriptor processing (lines LD and GD in FIG. 6).

Such a selective action is again schematically represented in FIG. 8 in the form of "switches" 1060-2/1062-2. When closed by the respective selector 1060-1/1062-1, the switch 1060-2/1062-2 will connect the memory 1064 to local descriptor processing (line LD) or global descriptor processing (line GD).

It will be appreciated that a block diagram as represented in FIG. 8 may also implement a selection strategy as discussed in connection with FIG. 7 (e.g. selection based on coordinates and orientations) if the elements exemplified by integers 1066-1, W1 and A1 are dispensed with.

More generally, in one or more embodiments the selection at 106 may be as a function of any combination of entities selected out of scale, coordinates and orientation.

One or more embodiments may adopt an arrangement as exemplified in FIG. 9 in order to evaluate the "usefulness" of the points of interest detected at 104 for descriptor processing based on their coordinates, orientations and scale.

In deciding what candidate interest points may be forwarded on to descriptor processing (e.g. 108, 118), such an arrangement may also provide a feedback loop towards the detection function/module in order to influence its behavior. For that reason, the block diagram of FIG. 9 details an exemplary structure of a detector/function 104 including two stages 104a and 104b, with the key point selection function/module 106 placed right after the stage 104b.

In one or more embodiments, the second stage 104b may perform over plural "octaves" (e.g. $1^{st}$ octave or fundamental, $2^{nd}$ octave, $3^{rd}$ octave, $4^{th}$ octave, . . . ) essentially the same kind of processing exemplified in the following.

Such processing over plural octaves is known per se from various implementations e.g. from the paper by Miroslaw Bober et al. discussed in the introductory portion of this description by pointing out that such an implementation may become increasingly inefficient as the number of DoGs per octave increases.

In one or more embodiments, the first stage 104a may thus have the primary purpose of "distributing" the block data form the culling function/module 102 (as possibly derived from a synch buffer 1040) over plural (sub)stages 1041, 1042, 1043, 1044, . . . connected e.g. via 1 pixel streaming which in turn forward to the second stage 104*b* respective data for $1^{st}$ octave, $2^{nd}$ octave, $3^{rd}$ octave, $4^{th}$ octave, . . . processing.

In one or more embodiments, the second stage 104*b* may cooperate with the key point selection function/module 106 by deciding the amount of interest points to be considered as produced at the output of a Difference of Gaussian (DoG) engine implemented in the second stage 104*b*, e.g. via an extrema detection engine.

In one or more embodiments, operation of the arrangement exemplified in FIG. 9 may based on the following concept:

if out of a certain number of points of interest detected for a i-th frame (image), only a (first) number L of features e.g. L_prev_frame has been selected;

then the selector may be made aware of this number L and for the next (i+1th) frame, a new target number L_next_frame may be set.

In one or more embodiments, this may occur as a function of the number of detected points achieved in the previous frame (points_detected_prev_frame) and the new target value for the number of those points (points_target_next_frame), namely:

L_next_frame=f(points_detected_prev_frame,points_target_next_frame).

An exemplary formula embodying that concept may be the following:

---

L_next_frame = L_prev_frame·
[k1+k2·(points_target_next_frame-points_detected_prev_frame)/
(points_target_next_frame)]

--- where k1 and k2 are parameters (possibly adjustable) which may be defined (e.g. empirically) depending on the application considered.

Also, as previously indicated, in one or more embodiments, different selection criteria may be adopted in view of local descriptor (LD) and global descriptor (GD) processing. In one or more embodiments, an adaptive selection mechanism as discussed in the foregoing may be implemented differently in selecting key points for local descriptor (LD) and global descriptor (GD) processing.

In one or more embodiments, the second stage 104*b* may thus be configured according to a "twin" structure, e.g. in view of implementing different selections criteria in view of local descriptor (LD) and global descriptor (GD) processing.

In one or more embodiments, such a structure may include:

first and second extrema detection stages 1046*a*, 1046*b*: these may be fed from the (sub)stages 1041, 1042, 1043, 1044, . . . with data for the respective octave processing and receive feedback from the key point selection function/module 106 as better detailed in the following;

first and second extrema location registers 1047*a*, 1047*b* which may be respectively fed from the first and second extrema detection stages 1046*a*, 1046*b* and receive feedback from the key point selection function/module 106 as better detailed in the following;

first and second gradient stages 1048*a*, 1048*b* which may be respectively fed from the first and second extrema location registers 1047*a*, 1047*b* as well as from respective first and second patch registers 1049*a*, 1049*b*; the output from the first and second gradient stages 1048*a*, 1048*b* may represent the (selective) detection results, e.g. candidate interest points and their orientations to be forwarded to the key point selection function/module 106.

The feedback lines from the selection function/module to the extrema detection stages 1046*a*, 1046*b* and extrema location registers 1047*a*, 1047*b* are exemplary of the possible implementation of the adaptive selection concept/formula, namely the selector stage 104*b* being made aware of the number of detected points achieved in the previous frame in order to permit a new target value to be set for the number of those points for the next frame, that is in order to influence the run time detection number of the interest points.

In one or more embodiments, extrema detection processing as implemented in the stage 104*b*, with the gradient (sub)stages 1047*a*, 1047*b* providing their outputs to the key point selection function/module 106 may involve two thresholding actions against respective (possibly adjustable) thresholds, based on low contrast point evaluation and edge response elimination, respectively.

In one or more embodiments, a low contrast point filter stage may adopt an approach as disclosed in D. G. Lowe: "Distinctive Image Features from Scale-Invariant Keypoints", International Journal of Computer Vision, 60, 91-110 (2004)—already cited—where stable key point locations in scale space may be efficiently detected by using scale-space extrema in the Difference-of-Gaussian function convolved with the image, denoted D(x,y,σ).

In one or more embodiments adopting that approach, filtering low contrast points may thus involve e.g. evaluating the $2^{nd}$-order Taylor expansion of D(x,y,σ) at the offset ($\underline{x}$) using the scale space value at previously found location, e.g.

$$D(\hat{x}) = D + \frac{1}{2}\frac{\partial D^T}{\partial x}\hat{x}.$$

and then, e.g.:

if the value is less than a first, low contrast threshold (e.g. 0.03)→the point is discarded;

otherwise: candidate keypoint KP @(x+x), scale σ where x is the original location of the candidate at scale σ.

In one or more embodiments, a second thresholding action may involve edge response elimination by using Hessian Eigenvalues since those are proportional to the principal curvatures of D (i.e. the elements of a 2×2 Hessian matrix H computed at the location and scale of the key point) by using the trace Tr(H) and the Determinant Det (H) of the Hessian matrix, where:

$$Tr(H)=Dxx+Dyy=\alpha+\beta, Det(H)=DxxDyy-(Dxy)^2=\alpha\beta$$

$$R=Tr(H)^2/Det(H)<(r+1)^2/r$$

For instance, for some threshold value $r_{th}$, if R for a candidate is larger than a second, edge response threshold, $(r_{th}+1)^2/r_{th}$ that keypoint may be regarded as poorly localized and hence rejected. An exemplary value may be $r_{th}=10$.

Such an approach may be implemented in an arrangement as exemplified in FIG. 9 e.g. in the first and second gradient stages 1048*a*, 1049*b* based on input from the first and second extrema location registers 1047*a*, 1047*b* which are respectively fed from the first and second extrema detection stages 1046*a*, 1046*b* as well as based on input from the first and second patch registers 1049*a*, 1049*b*.

In one or more embodiments the low contrast point evaluation and edge response elimination thresholds (possibly different in view of local descriptor and global descriptor processing) may adopt the adaptive (e.g. feedback-driven from the key point selection function/module 106) selection approach discussed in the foregoing, whereby any of these thresholds for a "next" frame, e.g. Th_next_frame may be made a function of L_next_frame and L_prev_frame, namely:

Th_next_frame=f(L_next_frame, L_prev_frame)

thereby affecting dynamically the number of interest points detected by the interest point detector.

Again, one exemplary formula embodying that concept may be the following:

$$Th\_next\_frame = Th\_prev\_frame \cdot [k3+k4 \cdot (L\_prev\_frame)/abs(L\_prev\_frame - L\_new\_frame)]$$

where k3 and k4 are parameters (possibly adjustable) which may be defined (e.g. empirically) depending on the application considered and abs( ) denotes absolute value.

In one or more embodiments, the adaptive (feedback-driven) thresholding exemplified herein in connection with the arrangement of FIG. 9 may involve even just one (and not both of) filtering out low contrast points and edge response elimination as exemplified in the foregoing.

It will be appreciated that, in one or more embodiments, the adaptive (feedback-driven) thresholding exemplified herein in connection with the arrangement of FIG. 9 may also be applied to the arrangements of FIGS. 6 and 8.

In one or more embodiments, the number of points which pass the low contrast point evaluation and edge response elimination thresholds considered in the foregoing may dictate how many of the interest points detected on an image/frame are rejected and how many are passed on to (further) selection in the function/module 106.

One or more embodiments as disclosed herein may aim at reducing (possibly in an adjustable/adaptive manner) the number of key points which are subjected to (local and/global) processing in order to generate (compact) descriptors of digital images, thus reducing the associated computation workload.

In one or more embodiments, this may occur e.g.:
at the block culling level, e.g. in the function/module 102, whereby only blocks "passing" an energy (variance) threshold are forwarded to further processing, while blocks failing to pass such a threshold are discarded;
at the selection level whereby only those interest points "passing" certain thresholds (as set e.g. the function/module 106 in the blocks 1060, 1062) are forwarded to further processing, while those points failing to pass such thresholds are discarded.

In one or more embodiments, as exemplified in FIG. 9, thresholding, with interest points "passing" certain thresholds being forwarded to further processing, while those points failing to pass such thresholds are discarded, may be effected (e.g. against adaptively varied thresholds) in the detector stage 104b.

Generally, for "tighter" thresholds, more blocks/points will fail to pass the threshold(s) and may be rejected; vice-versa for "looser" thresholds, more blocks/points will pass the threshold(s) and may be retained.

Throughout this detailed disclosure of exemplary embodiments, for the sake of simplicity and ease of understanding, an entity has been considered to "pass" a threshold if (equal or) higher than the threshold and "not to pass" a threshold if lower. It will be appreciated that, in one ore more embodiments, a value or entity being able to "pass" a threshold may generally refer such a value or entity being—compliant—with a certain threshold: a certain value or entity may thus "pass" a threshold by being either lower or higher (and possibly lower or equal, i.e. not higher, or possibly higher or equal, i.e. not lower) than the threshold, depending on the case considered.

In one or more embodiments, the results from processing as previously discussed in connection with FIGS. 5 to 9 may be subjected to descriptor processing as exemplified in FIG. 4, which may be "cascaded" to the processing exemplified in FIG. 3.

As indicated, in one or more embodiments, the output from the function/module 108 may include e.g. a number of vectors of e.g. 128 elements of 1 byte each.

In one or more embodiments, the output from the function/module 108 may derive from SIFT (Scale Invariant Feature Transform) processing e.g. as described in D. G. Lowe: "Distinctive Image Features from Scale-Invariant Keypoints", International Journal of Computer Vision, 60, 91-110 (2004)—already cited).

In one or more embodiments, the output from the function/module 108 may be forwarded to:
a transform function/module 110, followed by a Scalar Quantization (SQ)—Vector Quantization (VQ) may similarly apply—encoding function/module 112 having cascaded an arithmetic (alternatively prefix or entropy) encoding function/module 114,
a coordinate coding function/module 116 to produce compressed x and y coordinates for each interest point,
a global descriptor function/module 118 to perform an aggregation procedure (e.g. Scalable Compressed Fisher Vector or SCFV) to produce e.g. compact discriminative global descriptors GD.

In one or more embodiments, the transform function/module 110 may be as exemplified e.g. in ISO/IEC JTC1/SC29/WG11/W13758 August 2013, Vienna, Austria Test Model 7: Compact Descriptors for Visual Search Paragrafo 2.4 or any of e.g. Fourier Transform (e.g. FFT), Discrete Cosine Transform (DCT), Karhunen-Loeve.

In one or more embodiments, starting from vectors of e.g. 128 elements each of 1 byte or more, the quantization function/module 112 may produce vectors of elements each of less than 1 byte (down to 0).

In one or more embodiments, starting from vectors of e.g. 128 elements each of less than 1 byte, an encoding function/module as exemplified at 114 may produce a number of vectors encoded using e.g. 0, 1, 2 bits.

In one or more embodiments, a coordinate coding function/module 116 may generate a string of bits for a plurality of x, y pairs.

In one or more embodiments, a global descriptor function/module 118 may generate a string of bits for a number of vectors of e.g. 128 elements of 1 byte each.

The outputs from the functions/modules 114, 116 and 118 may then be consolidated in a exploitation function/module 120 e.g. for possible use in matching/retrieval operations as schematically represented in FIGS. 1 and 2.

Further details concerning the foregoing may be derived from the ISO/IEC document already mentioned in the foregoing, also in the light of the article by D. G. Lowe as cited in the foregoing. Hence, the corresponding detailed description is not repeated here for reasons of brevity, also because in itself it is not essential for the purpose of understanding the embodiments.

Without prejudice to the underlying principles of the disclosure, the details and embodiments may vary, even significantly, with respect to what is illustrated herein purely by way of non-limiting example, without thereby departing from the extent of protection. The extent of protection is determined by the claims that follow.

Having thus described at least one illustrative embodiment, various alterations, modifications, and improvements will readily occur to those skilled in the art. Such alterations, modifications, and improvements are intended to be within the spirit and scope of the disclosure. Accordingly, the foregoing description is by way of example only and is not intended as limiting.

The invention claimed is:

1. A method, comprising:
decomposing digital images into blocks;
computing an energy for each said block;
culling blocks based on the computed block energies and one or more energy thresholds;
detecting interest points in the blocks remaining after said culling;
selecting key points out of the detected interest points; and
generating compact descriptors of the digital images using the selected key points, wherein the selecting key points comprises:
selecting local key points based on one or more local selection thresholds; and
selecting global key points based on one or more global selection thresholds.

2. The method of claim 1 wherein the selecting key points out of the interest points is based on one or more of:
an interest point scale value;
an interest point coordinate value; and
an interest point orientation value.

3. The method of claim 2 wherein the selecting key points out of the interest points comprises comparing a selection threshold to a sum of a weighted interest point scale value, a weighted interest point coordinate value and a weighted interest point orientation value.

4. A method, comprising:
decomposing digital images into blocks;
computing an energy for each said block;
culling blocks based on the computed block energies and one or more energy thresholds;
detecting interest points in the blocks remaining after said culling;
selecting key points out of the detected interest points;
generating compact descriptors of the digital images using the selected key points; and,
adaptively varying a number of said key points selected.

5. The method of claim 4 wherein the selecting key points comprises:
selecting local key points based on one or more local selection thresholds; and
selecting global key points based on one or more global selection thresholds.

6. The method of claim 4 wherein said adaptively varying the number of said key points selected includes adaptively varying a number of interest points detected in the blocks remaining after said culling.

7. The method of claim 6 wherein adaptively varying the number of the interest points detected includes setting a number L_next_frame of target interest points to be detected for a next i+1-th frame starting from a number L_prev_frame of interest points detected for a previous i-th frame as a function of the number points_detected_prev_frame of interest points selected for said previous i-th frame and a Previously Presented target number points_targeted_next_frame of selected interest points for said next i+1-th frame.

8. The method of claim 6 wherein detecting the interest points in the blocks remaining after said culling comprises at least one of:
filtering out low contrast points; and
edge response elimination.

9. The method of claim 8 wherein said filtering out low contrast points comprises:
detecting stable interest point locations in scale space by using scale-space extrema in a Difference-of-Gaussian function convolved with the image $D(x,y,\sigma)$;
determining a value of a $2^{nd}$-order Taylor expansion of $D(x,y,\sigma)$ at an offset x using a scale space value at a previously found location; and
filtering out points based on the value determined and a low contrast threshold.

10. The method of claim 8 wherein said edge response elimination comprises:
determining Hessian Eigenvalues of a 2×2 Hessian matrix H computed at a location and scale of an interest point being considered;
computing a ratio R of a square of a trace Tr(H) and a Determinant Det (H) of said Hessian matrix; and
eliminating points based on said ratio R and an edge response threshold.

11. The method of claim 9, comprising determining at least one of said low contrast threshold and an edge response threshold on a frame-by-frame basis.

12. A device, comprising:
one or more memories; and
digital image processing circuitry, which, in operation:
decomposes digital images into blocks;
computes an energy value for each said block;
selects blocks based on the computed block energy values and one or more energy thresholds;
detects interest points in the selected blocks;
selects key points out of the detected interest points; and
generates compact descriptors of the digital images using the selected key points, wherein the digital image processing circuitry, in operation:
selects local key points based on one or more local selection thresholds; and
selects global key points based on one or more global selection thresholds.

13. The device of claim 12 wherein the digital image processing circuitry, in operation, selects key points out of the interest points based on one or more of:
an interest point scale value;
an interest point coordinate value; and
an interest point orientation value.

14. The device of claim 12 wherein the digital image processing circuitry, in operation, selects key points out of the interest points based on a comparison of a selection threshold to a sum of a weighted interest point scale value, a weighted interest point coordinate value and a weighted interest point orientation value.

15. A device, comprising:
one or more memories; and
digital image processing circuitry, which, in operation:
decomposes digital images into blocks;
computes an energy value for each said block;
selects blocks based on the computed block energy values and one or more energy thresholds;
detects interest points in the selected blocks;
selects key points out of the detected interest points; and generates compact descriptors of the digital images using the selected key points, wherein the digital image processing circuitry, in operation, adaptively varies a number of key points selected.

16. The device of claim 15 wherein the digital image processing circuitry, in operation:
   selects local key points based on one or more local selection thresholds; and
   selects global key points based on one or more global selection thresholds.

17. The device of claim 15 wherein the digital image processing circuitry, in operation, adaptively varies a number of interest points detected in the selected blocks.

18. The device of claim 17 wherein the digital image processing circuitry, in operation, sets a number L_next_frame of target interest points to be detected for a next i+1-th frame starting from a number L_prev_frame of interest points detected for a previous i-th frame as a function of the number points_detected_prev_frame of interest points selected for said previous i-th frame and a new target number points_targeted_next_frame of selected interest points for said next i+1-th frame.

19. The device of claim 17 wherein the digital image processing circuitry, in operation, detects the interest points in the selected blocks based on at least one of:
   low contrast point filtering; and
   edge response elimination.

20. The device of claim 19 wherein the digital image processing circuitry, in operation, filters out low contrast points by:
   detecting stable interest point locations in scale space by using scale-space extrema in a Difference-of-Gaussian function convolved with the image $D(x,y,\sigma)$;
   determining a value of a $2^{nd}$-order Taylor expansion of $D(x,y,\sigma)$ at an offset x using a scale space value at a previously found location; and
   filtering out points based on the value determined and a low contrast threshold.

21. The device of claim 20 wherein the digital image processing circuitry, in operation:
   determines Hessian Eigenvalues of a 2×2 Hessian matrix H computed at a location and scale of an interest point being considered;
   computes a ratio R of a square of a trace Tr(H) and a Determinant Det (H) of said Hessian matrix; and
   eliminates points based on said ratio R and an edge response threshold.

22. The device of claim 21 wherein the digital image processing circuitry, in operation, determines at least one of said low contrast threshold and said edge response threshold on a frame-by-frame basis.

23. A system, comprising:
   an image capture device, which, in operation, outputs digital images; and
   image processing circuitry coupled to the image capture device, and which, in operation:
      decomposes digital images into blocks;
      computes an energy value for each said block;
      selects blocks based on the computed block energy values and one or more energy thresholds;
      detects interest points in the selected blocks;
      selects key points out of the detected interest points; and
      generates compact descriptors of the digital images using the selected key points, wherein the image processing circuitry, in operation;
      selects local key points based on one or more local selection thresholds; and
      selects global key points based on one or more global selection thresholds.

24. The system of claim 23 wherein the image processing circuitry, in operation, selects key points out of the interest points based on one or more of:
   an interest point scale value;
   an interest point coordinate value; and
   an interest point orientation value.

25. A non-transitory computer-readable medium having contents which, when accessed by a digital image processor, configure the digital image processor to perform a method, the method comprising:
   decomposing digital images into blocks;
   computing an energy value for each block;
   selecting blocks based on the computed block energy values and one or more energy thresholds;
   detecting interest points in the selected blocks;
   selecting key points out of the detected interest points; and
   generating compact descriptors of the digital images using the selected key points wherein the selecting key points comprises:
   selecting local key points based on one or more local selection thresholds; and
   selecting global key points based on one or more global selection thresholds.

26. The computer-readable medium of claim 25 wherein the selecting key points is based on one or more of:
   an interest point scale value;
   an interest point coordinate value; and
   an interest point orientation value.

27. A method, comprising:
   decomposing digital images into blocks;
   computing an energy for each said block;
   culling blocks based on the computed block energies and one or more energy thresholds;
   detecting interest points in the blocks remaining after said culling;
   selecting key points out of the detected interest points; and
   generating compact descriptors of the digital images using the selected key points, wherein,
   the selecting key points out of the interest points is based on one or more of:
      an interest point scale value;
      an interest point coordinate value; and
      an interest point orientation value; and
   the selecting key points out of the interest points comprises comparing a selection threshold to a sum of a weighted interest point scale value, a weighted interest point coordinate value and a weighted interest point orientation value.

28. The method of claim 27, comprising:
   adaptively varying a number of said key points selected.

29. A device, comprising:
   one or more memories; and
   digital image processing circuitry, which, in operation:
      decomposes digital images into blocks;
      computes an energy value for each said block;
      selects blocks based on the computed block energy values and one or more energy thresholds;
      detects interest points in the selected blocks;
      selects key points out of the detected interest points; and generates compact descriptors of the digital images using the selected key points, wherein the digital image processing circuitry, in operation, selects key points out of the interest points based on a comparison of a selection threshold to a sum of a weighted interest point scale value, a weighted interest point coordinate value and a weighted interest point orientation value.

30. The device of claim 29 wherein the digital image processing circuitry, in operation, adaptively varies a number of key points selected.

* * * * *